US012573979B2

(12) United States Patent
Knoche et al.

(10) Patent No.: US 12,573,979 B2
(45) Date of Patent: Mar. 10, 2026

(54) ELECTRICAL ENERGY PRODUCTION PLANT THAT CAN BE INSTALLED ON STRUCTURES AND/OR AGRICULTURAL GROUNDS

(71) Applicant: REM TEC S.R.L., Asola (IT)

(72) Inventors: Ronald Knoche, Garches (FR); Giancarlo Ghidesi, Asola (IT)

(73) Assignee: REM TEC S.R.L., Asola (IT)

( * ) Notice: Subject to any disclaimer, the term of this patent is extended or adjusted under 35 U.S.C. 154(b) by 0 days.

(21) Appl. No.: 18/019,032

(22) PCT Filed: Aug. 2, 2021

(86) PCT No.: PCT/IB2021/057051
§ 371 (c)(1),
(2) Date: Jan. 31, 2023

(87) PCT Pub. No.: WO2022/029600
PCT Pub. Date: Feb. 10, 2022

(65) Prior Publication Data
US 2023/0318523 A1 Oct. 5, 2023

(30) Foreign Application Priority Data
Aug. 5, 2020 (IT) ......................... 102020000019333

(51) Int. Cl.
| | |
|---|---|
| *H02S 20/32* | (2014.01) |
| *A01G 9/24* | (2006.01) |
| *F24S 30/455* | (2018.01) |

(52) U.S. Cl.
CPC .............. *H02S 20/32* (2014.12); *A01G 9/243* (2013.01); *F24S 30/455* (2018.05)

(58) Field of Classification Search
None
See application file for complete search history.

(56) References Cited

U.S. PATENT DOCUMENTS

| | | | | | |
|---|---|---|---|---|---|
| 4,584,791 | A | * | 4/1986 | Wolf | ...................... A01G 31/02 47/79 |
| 8,502,129 | B2 | * | 8/2013 | Miller | ................... F24S 30/455 363/71 |

(Continued)

FOREIGN PATENT DOCUMENTS

| | | | | |
|---|---|---|---|---|
| EP | 2264378 | A2 | * 12/2010 | .............. F24S 25/13 |
| FR | 3077463 | A1 | 8/2019 | |

(Continued)

OTHER PUBLICATIONS

Machine translation of KR10-1964365B1 (Year: 2019).*

(Continued)

*Primary Examiner* — Ryan S Cannon

(74) *Attorney, Agent, or Firm* — CANTOR COLBURN LLP

(57) ABSTRACT

An electrical energy production plant includes a support structure formed by support poles aligned along a first axis (X) fixed to the ground in any orientation. On the support structure, there is a movement system for solar energy receptors (P), suitable for allowing the movement of these devices around at least a first axis (X).

The plant includes an electronic processing unit capable of controlling the movement of these receiving devices (P), and below this support structure, there are agricultural crops in different shapes, and this electronic processing unit, by using the movement of the receptor devices regulates the shadow generated on the ground according to the need for direct light, or the best conditions of air temperature and soil moisture, in order to optimize the development or growth of these crops.

4 Claims, 3 Drawing Sheets

(56)     References Cited

U.S. PATENT DOCUMENTS

| | | | | |
|---|---|---|---|---|
| 10,619,891 | B2 * | 4/2020 | Menard .................. | F24S 30/45 |
| 2011/0067301 | A1 | 3/2011 | Demitchell et al. | |
| 2014/0083007 | A1 | 3/2014 | Galvan | |
| 2015/0223418 | A1 | 8/2015 | Collins et al. | |
| 2015/0296724 | A1 * | 10/2015 | Martinez Ruanova | ...................... A01G 9/1407 47/62 R |
| 2017/0331416 | A1 * | 11/2017 | Chen ....................... | H02S 20/10 |

FOREIGN PATENT DOCUMENTS

| | | | | |
|---|---|---|---|---|
| KR | 1964365 | B1 * | 4/2019 | ............ A01G 7/045 |
| WO | 2010103378 | A1 | 9/2010 | |
| WO | 2013076573 | A1 | 5/2013 | |
| WO | 2013117722 | A1 | 8/2013 | |
| WO | 2019049094 | A1 | 3/2019 | |

OTHER PUBLICATIONS

International Search Report and Written Opinion for International Application No. PCT/IB2021/057051, International Filing Date Aug. 2, 2021, Date of Mailing Nov. 5, 2021, 10 pages.

* cited by examiner

ELECTRICAL ENERGY PRODUCTION PLANT THAT CAN BE INSTALLED ON STRUCTURES AND/OR AGRICULTURAL GROUNDS

CROSS-REFERENCE TO RELATED APPLICATIONS

The present application is a 35 U.S.C. § 371 National Stage patent application of International patent application PCT/IB2021/057051, filed on 2 Aug. 2021, which claims priority to Italian patent application 102020000019333, filed on 5 Aug. 2020.

TECHNICAL FIELD

The present disclosure refers to a solar and/or wind electrical energy production plant formed by a support structure bound to the ground, preferably an agricultural ground, suitable for supporting a movement system for devices suitable for receiving sunlight, for example photovoltaic panels. In particular, the movement system of the present disclosure allows the movement preferably around two axes X and Y of such devices, in order to allow them to keep photovoltaic panels or other devices suitable for capturing solar energy correctly oriented towards the sun.

This plant can be installed on agricultural grounds, or it can be associated with agricultural installations, leaving the possibility of exploiting this ground for the original purposes, that is for the cultivation of vegetables, cereals or for grazing animals.

BACKGROUND

A plant of this type is described in patent application WO2019049094 where greenhouses are positioned for growing vegetables in the same ground where the electrical energy production plant is located. The electrical energy produced by the plant is also used to power devices adapted to manage crops (for example sprinklers, environmental sensors placed inside and outside the greenhouse).

Systems for moving solar panels on two axes, which are jargonally called "solar trackers", are known.

The main purpose of a tracker is to maximise the efficiency of the solar device housed on board. The greater the perpendicular alignment with the sun's rays, the greater the conversion efficiency and the more energy produced for the same surface area, the smaller the surface area of solar panel required for the same output, the lower the plant costs.

The orientation of the modules is also defined to avoid mutual shading which would drastically reduce production.

The most sophisticated trackers have two degrees of freedom, with which they aim to perfectly align the orthogonal of the photovoltaic panels with the sun's rays in real time. The cheapest, but not the only, way to realise them is to mount one tracker on board another. With these trackers, increases in electricity production of up to 35%-45% can be achieved, but with greater construction complexity.

Such a type of solar tracker is shown in patent application WO2010103378 which describes a support structure formed by support poles held in position by a network of tie rods, both the support poles and the tie rods are fixed in the ground by means of a hinge pin.

The solar tracker comprises a main horizontal bearing profile, which can rotate around its own axis, to which a plurality of secondary profiles are connected, fixed perpendicularly to the main profile and which can be rotated around its own axis. The solar panels are fixed on these secondary profiles. The ends of the main tracker profile are supported and fixed on these support profiles. The electrical cables connecting the various panels and carrying the current generated by them can also be positioned inside the main profile.

Patent WO2013076573 describes a support piling structure of this type that also supports wind modules. This structure is made in a two-dimensional "chequered" fashion and can be installed on agricultural grounds because it is raised and the distance between the support poles is such as to allow the passage of even large agricultural vehicles.

Patent application WO2013117722 describes a solar energy production method and plant which is suitable for being installed on an agricultural ground. In such a plant, the photovoltaic modules and the support structure can be oriented in such a way that a cultivated area underneath the modules is partially shaded. In this case, the orientation of the photovoltaic modules according to the disclosure allows for incident solar radiation on the cultivated plants.

In patent applications US2014083007 and US2011067301, hydroponic systems for providing continuous flow nutrient solutions to the roots of a plurality of plants are described. The system includes a tubular assembly of horizontally inclined (or spiral-shaped) elements interconnected to each other comprising a plurality of housings which are configured to receive the roots of the plurality of plants. Inside the tubular elements, the irrigation solution is made to flow from top to bottom, for example by means of a special pump. The horizontally inclined elements allow the solution to flow downwards through the tubular assembly before exiting through the bottom in order to return to the pump.

The Applicant has noted that such support structures for solar panels not only leave a suitable space for growing vegetables, but this space can be used for the installation of agricultural structures for intensive cultivation, the management of shading derived from the positioning of the mobile panels over time (e.g. time of day and/or season) and the conditions (e.g. dry weather, wet weather, rain, fog, etc.), can optimise the growth of the crops below the plant.

In addition, a portion of the electricity generated by the plant can be used to control and power the equipment in the agricultural installations.

SUMMARY

One aspect of the present disclosure relates to a solar energy production plant having the characteristics of the appended claim 1.

Further features of the present disclosure are contained in the dependent claims.

BRIEF DESCRIPTION OF THE DRAWINGS

The characteristics and advantages of the present disclosure will become more apparent from the following description of an embodiment of the disclosure, provided by way of non-limiting example, with reference to the schematic attached drawings, wherein:

FIG. 4a shows a front view of the plant according to the present disclosure provided with a first structure for hydroponic cultivation; and.

3

Figure 1:
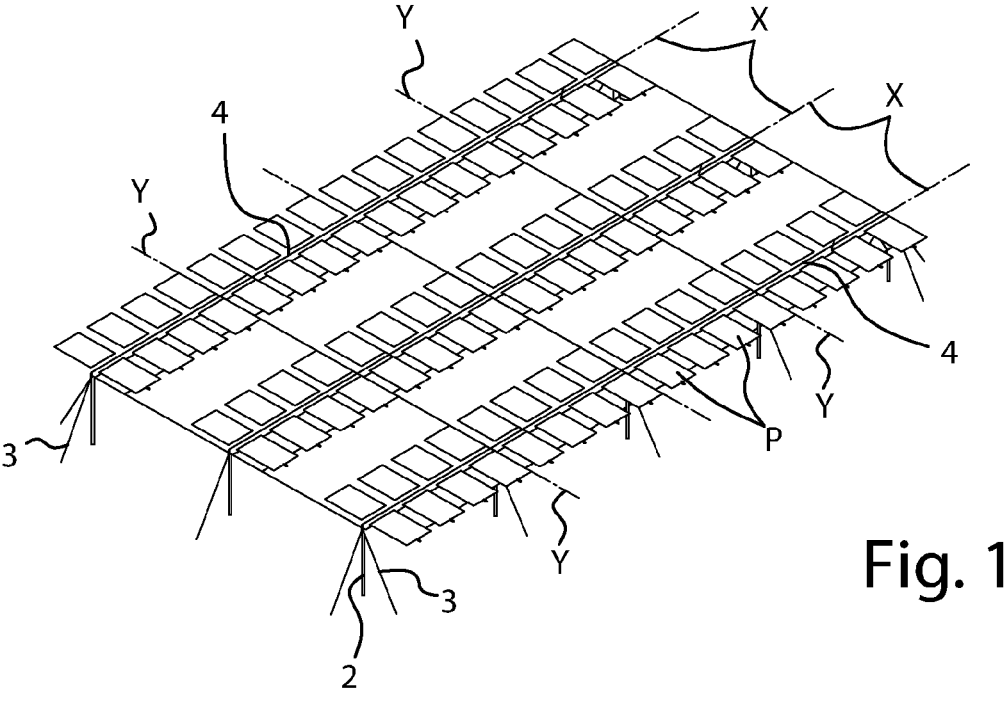
FIG. 1 shows a perspective view of a plant according to the present disclosure.
Figure 2:
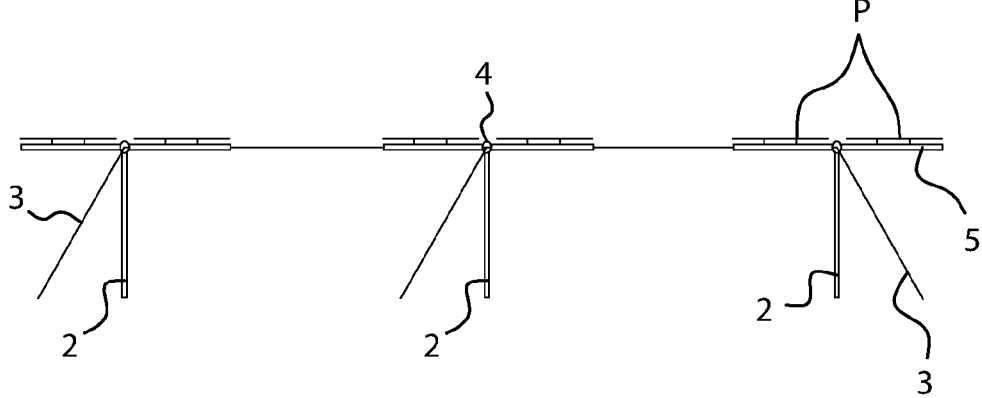
FIG. 2 shows a front view of the plant in FIG. 1.
Figure 3:
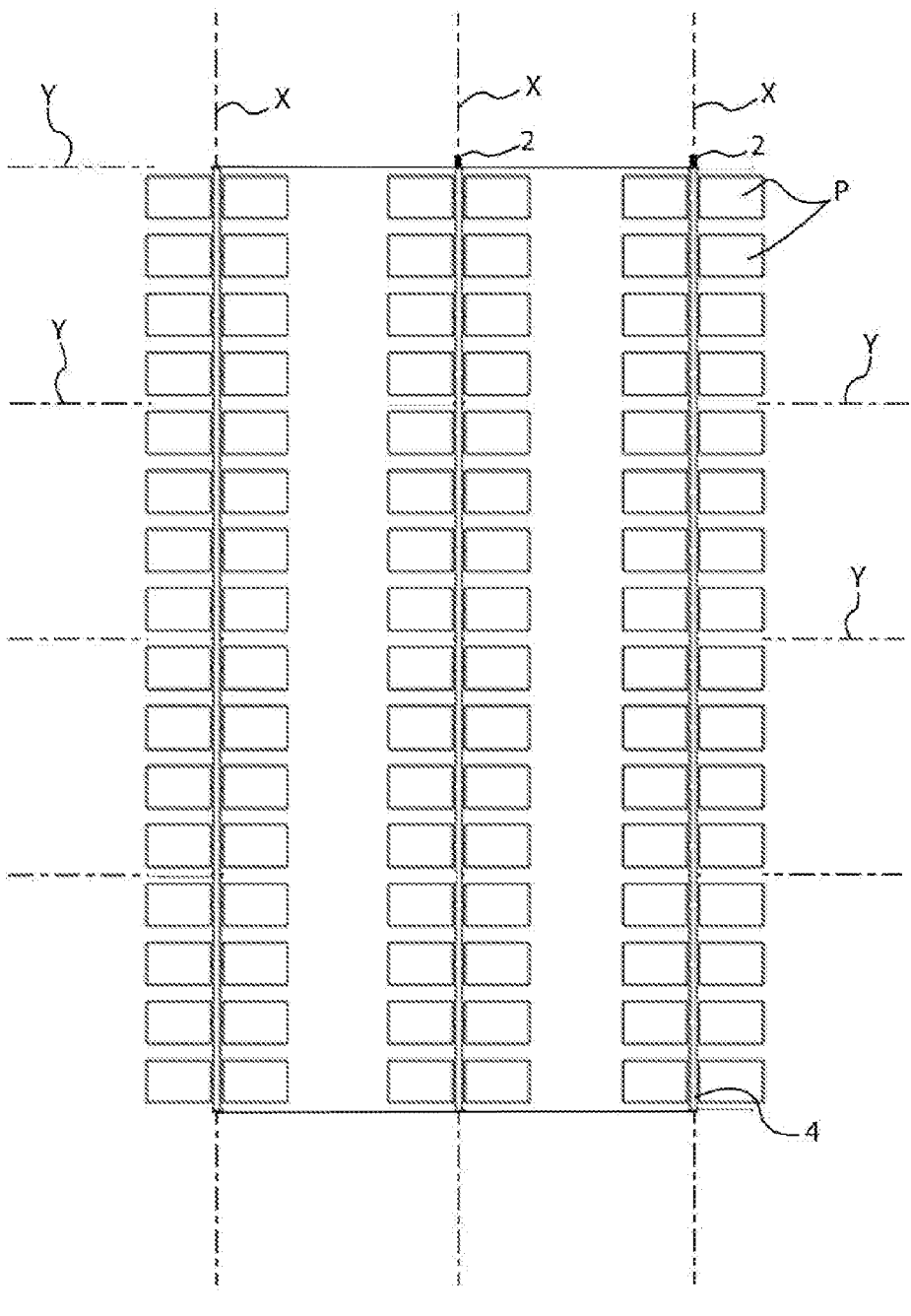
FIG. 3 shows a top view of the plant of FIG. 1.
Figure 4A:
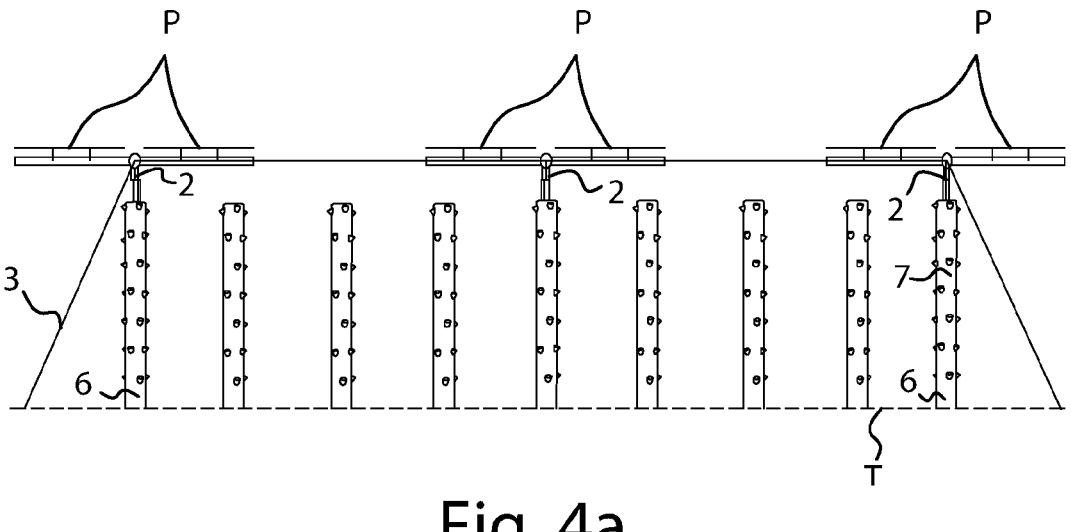
Figure 4B:
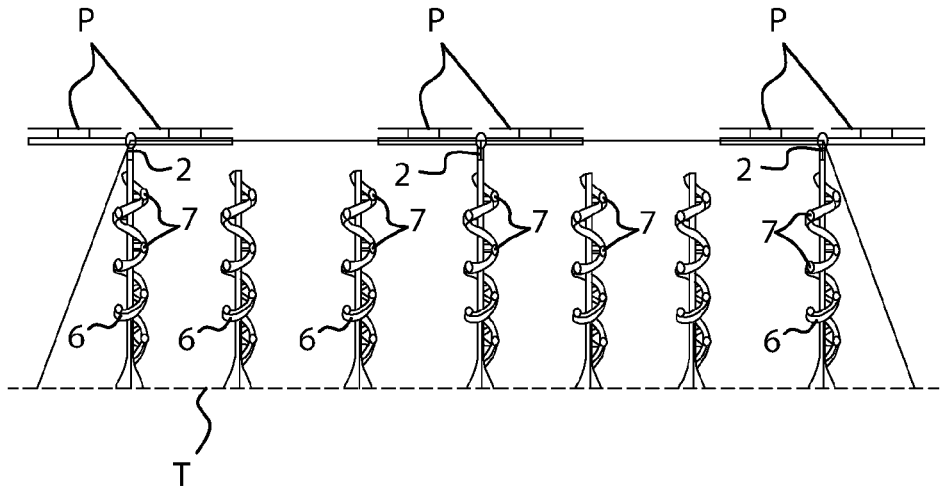

FIG. 4*b* shows a front view of the plant according to the present disclosure provided with a second structure for hydroponic cultivation.

DETAILED DESCRIPTION OF THE DRAWINGS

With reference to the aforementioned figures, the electrical energy production plant according to the present disclosure essentially comprises a support structure formed by support poles 2 preferably held in position by a network of tie rods or steel bars 3, both the support poles and the tie rods being fixed to the ground by means of suitable pins, for example hinge pins. This structure can advantageously be configured with the poles aligned along a first axis X in any orientation, or two-dimensional along this axis X and a second axis Y substantially orthogonal to the first one so as to form a "chequered" structure and can be installed on agricultural grounds, as it is raised and the distance between the support poles is such as to allow the passage of even large agricultural vehicles.

In addition, agricultural installations can be obtained on this plant.

This support structure can alternatively be made by piling in concrete poles, which will have a portion driven into the ground and a part above ground capable of giving the structure adequate height from the ground. Said piling may be or may not be connected by tie rods or steel bars.

Systems for the movement or the orientation of solar devices are positioned on said support structure and in particular on rows of poles. Wind devices can also be positioned on the tops of these poles.

The system allows the movement on the first axis X and also on the second axis Y, of the devices suitable to receive sunlight, to allow them to maintain the desired and correct orientation towards the sun. For example, such devices are photovoltaic panels or other devices capable of capturing solar energy.

Each movement system comprises a main profile 4 rotating around its own axis, and arranged in place substantially horizontally, to which a plurality of secondary profiles 5 are connected, preferably fixed perpendicularly to the main profile in a rigid manner or alternatively by means of appropriate actuation systems suitable to confer the ability to rotate. The solar devices are fixed on these secondary profiles, in the specific case illustrated the photovoltaic panels P.

The movement system also comprises a movement mechanism for the primary profiles and optionally a movement mechanism for the secondary profiles.

Clearly, the materials for the various parts have been chosen appropriately for the right balance of weight and strength.

The movements of the motors that allow the aforesaid rotations around the axes X and Y are controlled by a special electronic processing unit that determines the angle that the panels must present throughout the day and in all weather conditions, with feedback from a special tilt sensor.

The primary and secondary profiles are shaped as primary and secondary tubes within which the respective movement mechanisms are located.

Since this system can move the panels according to the first axis X and also the second axis Y, the movement or the orientation of solar devices is always possible regardless of the arrangement of the system on the ground.

According to the present disclosure below this support structure there are agricultural crops, comprising cultivation on the land T below the installation or agricultural installations, such as, for example, structures for hydroponic cultivation.

The electronic processing unit, through the movement of the receptor devices, regulates the shadow generated on the ground according to the need for direct light, in order to optimise the development or growth of these crops, also taking into account other parameters such as temperature and soil moisture.

Hydroponic cultivation refers to the cultivation of plants above ground, i.e. without earth and thanks to water, in which suitable nutrients capable of making the plants grow quickly and healthily are dissolved.

Such a structure comprises a complex of tubular elements 6 which develop vertically from top to bottom, for example with a cylindrical, helical, zig-zag inclined, or similar development, in which housings 7 (for example funnel-shaped holes) are obtained for positioning plants or the like, in such a way that their roots are placed inside the tubular elements. In such elements, a nutrient solution (for example water) is flowed from top to bottom which reaches the aforementioned roots. The solution is collected at the lower end of the structure and returned to the top thereof in order to be reintroduced into the pipes, for example thanks to a pump (not shown).

The Applicant has noted that such structures which develop vertically can be advantageously constrained to the support structure, for example to the poles 2, leaving however space for agricultural cultivation on the ground free. The support structure acts as a constraint on the complex of tubular elements and the relative command and control equipment of the structure such as pumps, sensors and actuators. This equipment can be directly powered by the electricity generated by the system and controlled by the electronic processing unit of the system itself. In addition, this support structure of the plant can be used to convey the liquid nutrient solution to the top of the complex of tubular elements, for example through the poles 2 and the rotating profiles 4 and/or 5, which when they are shaped like a pipe can accommodate inside them the ducts for such liquid solutions.

In order to achieve the best results with hydroponic cultivation, it is essential to monitor a number of essential parameters: temperature, moisture, $CO_2$ level, light hours and intensity of illumination, ventilation, plant health and absence of diseases (although the spread of pest-related diseases in hydroponic cultivation is significantly lower than to what generally happens in conventional cultivation). According to the present disclosure, the plant is equipped with sensors for monitoring the environmental conditions in the plant such as those indicated above, which send their measurements to the electronic processing unit of the plant, which determines the movements of the solar panels and the regulations relating to the irrigation of the plants accordingly.

Depending on the crop below the plant and/or of the presence of the hydroponic cultivation structure, the standard operation of the system to regulate the shade generated on the ground according to the need for light can be modified.

The management of shading takes place through a program stored in the electronic processing unit of the plant which allows the operator to define a percentage of shading on the ground, defined as a shaded area on the reference area (which may coincide with the surface of the plant or a part of a plant where a specific species is grown). The defined shading percentage can refer to the whole day or to a time interval within the day.

The program calculates the new angles X and Y relative to the inclination of the primary and secondary axes of the plant, which allows the desired shading to be obtained. With the same positions which allow achieving the target shading, the program chooses the combination that maximises the electrical energy production, based on statistical meteorological data typical of the location where the plant is located.

The program also comprises the possibility of defining the percentage reduction of irradiation over the day/time interval instead of the shaded area.

This will make it possible to take into account the variation in the intensity of solar radiation over the course of the day and as the season changes.

The processing unit is also able to generate an agricultural database in which, by selecting the crop in question and other parameters (such as irrigation, soil type), the ideal degree of shading for the crop is automatically calculated.

The processing unit is also capable of acquiring data on the cultivation parameters in situ (temperature and soil moisture) both as historical data and "real time", for a definition of the optimal shade/irradiation percentage for the crop.

The invention claimed is:

1. An electrical energy production plant comprising:

a support structure formed by substantially vertical support poles aligned along a first axis (X) fixed to the ground in any orientation, on said support structure being present a movement system for solar energy receptors (P), suitable for allowing the movement of these receptors around the first axis (X), said movement system comprises a main profile rotating around its own axis, and arranged in place substantially horizontally, to which a plurality of secondary profiles are connected, fixed perpendicularly to the main profile in a rigid manner or by actuation systems configured to rotate, said solar receptors fixed on the secondary profiles, an electronic processing unit capable of controlling the movement of the solar energy receptors (P), below said support structure there are agricultural crops in different shapes and this electronic processing unit by movement of the solar energy receptors regulates the shadow generated on the ground according to a need for direct light, or the best conditions of air temperature and soil moisture, in order to optimize the development or growth of the agricultural crops, wherein agricultural installations are structures for hydroponic cultivation comprising a complex of tubular elements which develop substantially vertically, in which housings are obtained for positioning plants, such that plant roots are placed inside the complex of tubular elements, and a nutrient solution is flowed from top to bottom which reaches the aforementioned roots, wherein said support structure is configured to secure the complex of tubular elements, said tubular elements are tied to the support poles, such that there is a space configured for agricultural cultivation on the ground free, the support structure of the plant is used to convey the nutrient solution to the top of the complex of tubular elements through the support poles and through the main profile and/or the secondary profiles, wherein the support poles, the main profile and/or the secondary profiles have a pipe shape and are configured to accommodate therein the ducts for the nutrient solution, wherein command and control equipment of the hydroponic structure are controlled by the electronic processing unit of the plant, and command and control equipment are powered by electricity generated by the plant.

2. The plant according to claim 1, wherein said support structure is a two-dimensional checkerboard.

3. The plant according to claim 1, wherein the solar energy receptors are photovoltaic panels.

4. The plant according to claim 1, wherein the solar energy receptors also rotate around a second axis (Y) substantially orthogonal to the first axis (X).

* * * * *